United States Patent [19]

Lieberman et al.

[11] Patent Number: 5,273,295
[45] Date of Patent: Dec. 28, 1993

[54] DEBUCKLER

[76] Inventors: Robert L. Lieberman, 1331 Casiano Rd., Los Angeles, Calif. 90049; Raymond P. Ng, 2602 Gardi St., Duarte, Calif. 91010

[21] Appl. No.: 20,790

[22] Filed: Feb. 22, 1993

[51] Int. Cl.$^5$ .............................................. B23B 25/06
[52] U.S. Cl. .................................... 279/126; 82/165; 82/173; 279/51; 279/158; 408/8; 408/13
[58] Field of Search ............ 279/126, 158, 123, 51–53, 279/58, 59, 66, 60–65; 82/165, 173; 408/16, 8, 13

[56] References Cited

FOREIGN PATENT DOCUMENTS 3600466 7/1987 Fed. Rep. of Germany ........ 408/16
59-53108 3/1984 Japan ................................. 279/126

Primary Examiner—Steven C. Bishop
Attorney, Agent, or Firm—Robert M. Sperry

[57] ABSTRACT

An improved machine tool having means for automatically sensing axial movement of the jaw members relative to the collet housing and for adjusting the axial position of the collet to automatically compensate for the jaw movement to allow radial gripping of the workpiece with no axial movement.

5 Claims, 1 Drawing Sheet

DEBUCKLER

BACKGROUND

1. Field of the Invention

This invention relates to machine tools and is particularly directed to machine tools having jaws for gripping a workpiece with means for sensing the position of the jaw and for causing outward movement of the jaw as the jaw tightens on the workpiece to prevent buckling of the workpiece.

2. Prior Art

In the course of metal part forming, such as straightening, detwisting, stretch wrap forming and the like, the workpiece is usually gripped in the jaws of a machine tool, in order to subject the workpiece to a desired thermal or mechanical process. Many of the machine tool jaws, used for gripping workpieces, are merely large versions of the familiar chuck or collet found in hand drills and constructed with a hollow housing having interior walls which taper inwardly toward the gripping end of the housing. A plurality of jaw members are located with the housing and are formed with inclined outer surfaces and means are provided for moving the jaw members toward or away from the gripping end of the housing. As the jaw members are moved toward the gripping end of the housing, the inclined outer surfaces of the jaw members bear against the tapered inner walls and are forced to move radially inwardly toward each other and to grip any workpiece inserted between the jaw members. Once the workpiece is engaged by the jaw members, any attempt to draw the workpiece outwardly from the housing will cause the jaw members to be pulled toward the gripping end of the housing and, hence, will cause the jaw members to further tighten their grip on the workpiece.

When the workpiece is to be held between two opposing chucks or collets, as in a lathe or the like, it is, first, customary to securely grip one end of the workpiece in one of the collets, which is usually fixed in position along the bed of the machine tool. Thereafter, the jaw members of the second collet are fully opened to freely accept the workpiece. After the workpiece is inserted between the jaws of the second collet, the jaws of the second collet are caused to grip the workpiece by moving the jaw members toward the gripping end of its housing, either manually, by means of a chuck key or the like, or by suitable power-driven means. However, once the jaw members make contact with the workpiece, the continued movement of the jaw members, which is necessary to make the jaw members firmly grip the workpiece, also causes the jaw members to push the workpiece outwardly of the gripping end of the housing. This pushing movement serves to drive the workpiece toward the first collet, which is stationary, and can be as much as 0.5 to 3.0 inches. Unfortunately, such movement often results in bending or buckling of the workpiece, which can damage or ruin expensive workpiece. This is a serious and expensive problem, even with highly-skilled and careful workmen. Nevertheless, virtually no prior art devices have been proposed to overcome this problem.

A search in the United States Patent Office has revealed the following references:

| U.S. PAT. NO. | INVENTOR | ISSUED |
|---|---|---|
| 4,989,887 | P. T. Jordan | Feb. 5, 1991 |
| 4,971,339 | C. C. Treff | Nov. 20, 1990 |
| 4,938,490 | R. P. Bosek | Jul. 3, 1990 |
| 4,690,415 | W. B. Holdridge | Sep. 1, 1987 |

The patents to Jordan, Treff and Bosek each relate to means for ensuring that the jaw members move radially in a controlled or uniform manner to provide uniform radial gripping and positioning of the workpiece. However, none of these patents concerns axial movement of the workpiece. The patent to Holdridge is directed to preventing axial movement of the workpiece. However, the Holdridge mechanism is complex and expensive to install and requires considerable ongoing maintenance. Thus, none of the prior art devices are entirely satisfactory.

BRIEF SUMMARY AND OBJECTS OF INVENTION

These disadvantages of prior art machine tools are overcome with the present invention and an improved machine tool is provide a machine tool which permits firm and secure gripping of a workpiece, yet which precludes axial movement of the workpiece an, thereby, prevents bending, buckling and other damage to the workpiece by the collet.

These advantages of the present invention are preferably attained by providing an improved machine tool having means for automatically sensing axial movement of the jaw members relative to the collet housing and for adjusting the axial position of the collet to automatically compensate for the jaw movement to allow radial gripping of the workpiece with no axial movement.

Accordingly, it is an object of the present invention to provide an improved machine tool.

Another object of the present invention is to provide an improved means for gripping a workpiece by the collet of a machine tool.

A further object of the present invention is to provide an improved machine tool having means for preventing bending, buckling or other damage to a workpiece as the workpiece i being gripped by the machine tool.

An additional object of the present invention is to provide an improved machine tool having means for precluding undesired axial movement of a workpiece as the workpiece is being gripped by the machine tool.

A specific object of the present invention is to provide an improved machine tool having means for automatically sensing axial movement of the jaw members relative to the collet housing and for adjusting the axial position of the collet to automatically compensate for the jaw movement to allow radial gripping of the workpiece with no axial movement.

These and other objects and features of the present invention will be apparent from the following detailed description, taken with reference to the figures of the accompanying drawings.

DETAILED DESCRIPTION OF THE INVENTION

Figure 1:
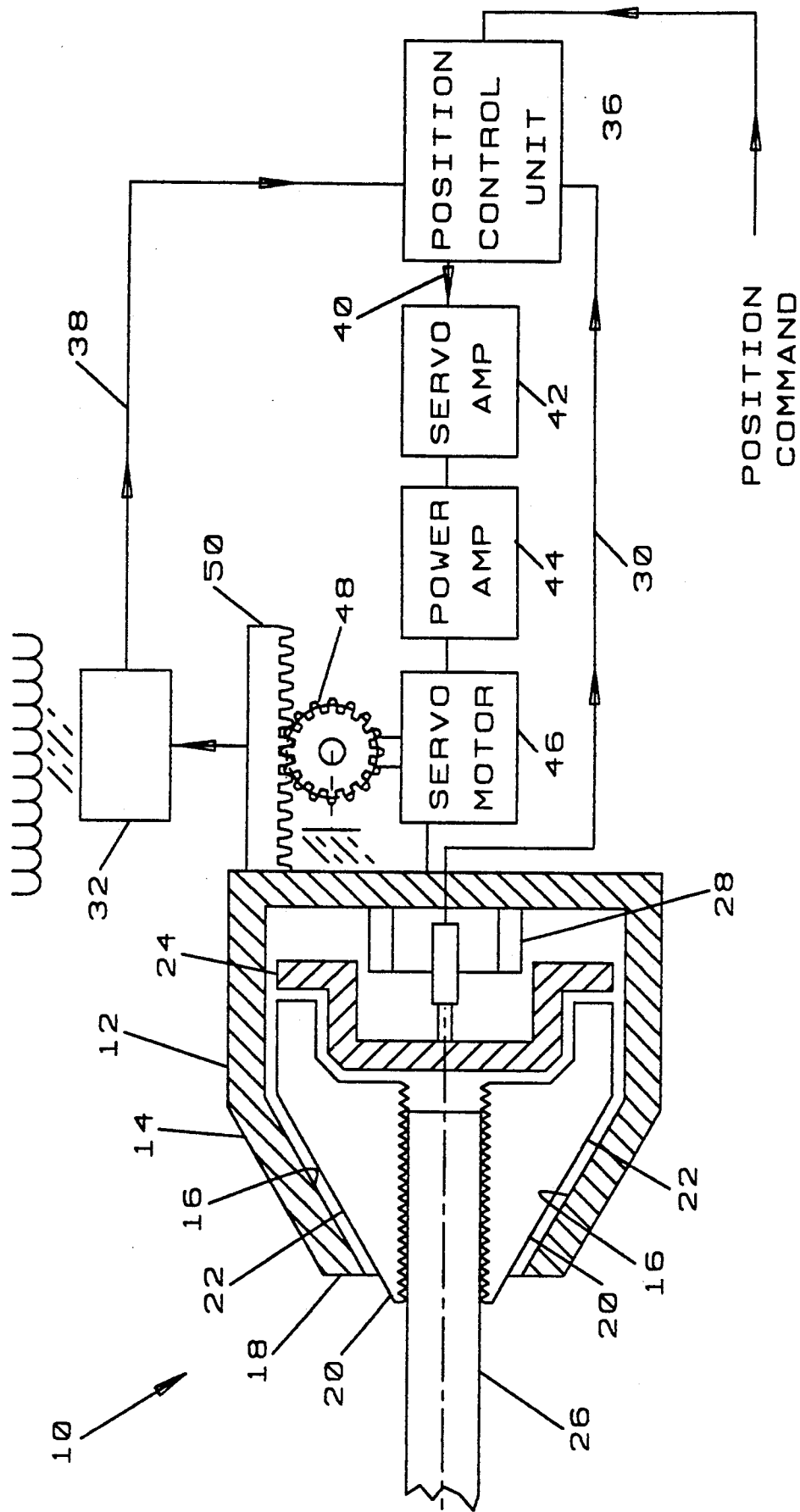
FIG. 1 is a diagrammatic representation showing a machine tool embodying the present invention.

In that form of the present invention chosen for purposes of illustration in the drawing. FIG. 1 shows a machine tool, indicated generally at 10, having a collet 12 comprising a hollow housing 14 having interior wall 16 which taper inwardly toward the gripping end 18 of the housing 14. A plurality of jaw members 20 are located within the housing 14 and are each formed with an inclined outer surface 22. A drive member 24, driven by suitable power means, not shown, is provided for moving the jaw members 20 toward or away form the gripping end 18 of the housing 14. As the jaw members 20 move toward the gripping end 18 of the housing 14, the inclined outer surfaces 22 of the jaw members 20 bear against the tapered inner walls 16 of the housing 14 and are forced to move radially inwardly toward each other and to grip any workpiece 26 which is inserted between the jaw members 20. Once the workpiece 26 is engaged by the jaw members 20, the jaw members 20 are caused to grip the workpiece 26 by continuing to move the jaw members 20 toward the gripping end 18 of its housing 14 and toward the workpiece 26. However, when the jaw members 20 move, a position sensing transducer 28 detects the movement of the jaw members 20 relative to the housing 14 and passes an electrical signal indicative of such movement through wire 30 to a suitable position control unit 36. The position control until 36 algebraically sums the signal from the drive member position transducer 28 with a second signal, passed by the collet housing position sensing transducer 32 through wire 38, and supplies a command signal through wire 40, servo amplifier 42 and power amplifier 44 to a suitable servo motor 46 which acts through suitable means, such as gear 48 and rack 50, to move the collet housing 14 away from the workpiece 26 precisely the same distance that the jaw members 20 are moved toward the workpiece 26. Thus, the forward movements of the jaw members 20 are balanced against the rearward movement of the collet housing 14 so that no movement is transmitted to the workpiece 26. Consequently, no bending or buckling can be caused to the workpiece 26 and this source of expensive damage to the workpiece 26 is eliminated.

In use, when the workpiece is to be held between two opposing chuck or collets, as in a lathe or the like, one end of the workpiece is firmly secured in the first collet housing 14 are fully opened to freely accept the workpiece 26. After the workpiece 26 is inserted between the jaw members 20 of the collet housing 14, the jaw members 20 are caused to grip the workpiece 26 by moving the jaw members 20 toward the gripping end 18 of the housing 14. However, once the jaw members 20 make contact with the workpiece 26, the continued movement of the jaw members 20 toward the gripping end 18 of the housing 14 and toward the workpiece 26, which is necessary to make the jaw members 20 firmly grip the workpiece 26, causes the position sensing transducer 28 to send a first electrical signal through wire 30 to the position control unit 36 and to send a second electrical signal from collet housing transducer 32, through wire 38, to the position control unit 36. The position control unit 36 compares the two electrical signals and issues a command signal through wire 40, servo amplifier 42 and power amplifier 44 to servo motor 46 which, in response, drives gear 48 and rack 50 to move the housing 14 away from the workpiece 26 by a distance equal to the forward movement of the jaw members 20. Thus, the forward movements of the jaw members 20 are balanced against the rearward movement of the housing 14 so that no movement is transmitted to the workpiece 26. Consequently, no bending or buckling can be caused to the workpiece 26 and this source of expensive damage to the workpiece 26 is eliminated.

Obviously, numerous variations and modifications can be made without departing from the spirit of the present invention. Therefore, it should be clearly understood that the form of the present invention described above and shown in the accompanying drawing is illustrative only and is not intended to limit the scope of the present invention.

What is claimed is:

1. A machine tool comprising:
   a hollow collet housing having an open forward end and formed with interior walls which taper inwardly toward said open end,
   a plurality of jaw members located within said housing each having an inclined outer surface,
   drive means for moving said jaw members toward and away from said open end of said housing,
   a position sensing transducer connected to sense movement of said jaw members relative to said housing and to generate an electrical signal indicative of such movement, and
   means responsive to said signal from said transducer for moving said housing a corresponding distance.

2. The machine tool of claim wherein:
   said last named means serves to move said housing in a direction opposite from the direction of movement of said jaw members.

3. The machine tool of claim 1 wherein:
   said last named means is a servo system.

4. The machine tool of claim 1 wherein:
   said machine tool has a first collet and a second collet and said transducer is mounted on said second collet.

5. The machine tool of claim 4 wherein:
   said machine tool has an elongated bed with said first collet mounted adjacent one end of said bed and said second collet being movable mounted adjacent the opposite end of said bed.

* * * * *